United States Patent [19]

Bunce

[11] Patent Number: 5,004,009
[45] Date of Patent: Apr. 2, 1991

[54] VALVE DEVICE FOR CONTROLLING LIQUID FLOW

[75] Inventor: Kevin R. Bunce, Baldock, England

[73] Assignee: Elopak A/S, Lierstranda, Norway

[21] Appl. No.: 451,126

[22] Filed: Dec. 15, 1989

Related U.S. Application Data

[63] Continuation of Ser. No. 261,560, Oct. 24, 1988, abandoned.

[30] Foreign Application Priority Data

Oct. 26, 1987 [GB] United Kingdom ............... 8725026

[51] Int. Cl.$^5$ .................. F16K 27/04; F16K 23/00
[52] U.S. Cl. .................. 137/512.3; 137/494; 137/512.5; 137/513; 137/541
[58] Field of Search .............. 137/494, 512.3, 512.5, 137/513, 541, 467.5; 51/900

[56] References Cited

U.S. PATENT DOCUMENTS

| | | | |
|---|---|---|---|
| 1,695,722 | 12/1928 | Smith | 137/541 |
| 1,889,503 | 11/1932 | Thomas | 137/541 X |
| 2,316,480 | 4/1943 | White et al. | 137/541 |
| 2,599,622 | 6/1952 | Folmsbee | 251/900 X |
| 2,608,992 | 9/1952 | Folmsbee et al. | 137/541 |
| 2,784,737 | 3/1957 | Kelly | 137/541 X |
| 2,834,374 | 5/1958 | Klinkenberg | 137/541 |
| 3,159,378 | 12/1964 | Haag | 251/900 X |
| 4,648,421 | 3/1987 | Chant et al. | 137/541 X |

Primary Examiner—John Rivell
Attorney, Agent, or Firm—John C. Evans

[57] ABSTRACT

A valve device comprises a vertical, tubular housing, a vertical valve member in the housing, and a coil-form compression spring encircling the member and urging it upwardly against a valve seat in the housing lower end. The member includes an upper, obturating portion and a lower, closure portion and its internal surface includes an upper annular part which diverges downwardly at a gradually increasing angle away from the location of the obturating portion in the valve closed condition. The internal surface includes a lower annular part converging downwardly at a substantial angle to the housing axis and situated directed radially outwards of the spring. Below the seat is an outlet mouth encircled by a rim, the closure part having a bottom lip at such clearance relative to the rim that, shortly before the closure part seals against the seat, the rim and the lip act shearingly upon liquid therebetween. The member includes three guiding fins in sliding contact with the internal surface. The seat may consist of moulded-in elastomeric material.

15 Claims, 3 Drawing Sheets

VALVE DEVICE FOR CONTROLLING LIQUID FLOW

This is a continuation of Application Ser. No. 261,560, filed on Oct. 24, 1988 now abandoned.

BACKGROUND OF THE INVENTION

1. Field of the Invention

This invention relates to a valve device for controlling liquid flow, in particular for use in filling a carton.

2. Description of the Prior Art

Various valve devices for filling containers are known. French Patent Application Publication No. 2299628 and U.S. Pat. Nos. 3949791 and 4079762 disclose a variety of possible constructions of such devices.

Published British Patent Specification 2043604A discloses a filling valve device for pressurized fluids which comprises a nozzle containing a stem axially displaceable downwardly under the thrust of the fluid against the bias of a helical spring closely encircling the stem. The stem carries an obturating dish at the top and a valve closure head at the bottom, the dish dividing the nozzle interior into two spaces, one communicating with a source of pressurized fluid, the other communicating with the interior of the container to be filled whenever the valve closure head is depressed.

Contact of the fluid with air exterior to the nozzle is prevented and possible foam formation is discharged through an axial passageway formed through the stem and through an elbow conduit coaxial with the stem axis and aligned with the central bore of the stem. The spring acts between the underside of the dish and the top of a horizontal spider mounted in the interior of the nozzle, the spider being composed of a central, stem-guiding ring having radial spokes which rest against a step formed in the internal surface of the nozzle. Below the spider, the internal surface of the nozzle converges downwardly at a substantial angle to the nozzle axis. In the open condition of the valve device, the liquid flows down through between the obturating dish and the internal surface, past the outside of the spring, and through the spokes of the spider. The valve head, which protrudes downwardly from the outlet end of the nozzle, carries a gasket for bearing upwardly against that outlet end to seal the same.

A problem with this device is that the close encircling of the stem by the spring and the use of a spider and a sealing gasket provide crevices where solids content can accumulate and be very difficult to remove by flushing of the device.

Published European Patent Application 0090664 discloses a valve device for use in filling cartons, which includes a metal tubular housing containing a metal valve member comprising a closure part co-operating with a metal valve seat at the lower extremity of the housing, and a driving part movably received with clearance in the housing. In one embodiment, the internal surface of the upper part of the housing is co-axial with the housing and comprises, progressing downwards, a cylindrical zone, followed by a downwardly diverging frusto-conical zone at about 10° to the axis of the housing, followed by a substantially radially inwardly directed annular zone, followed by a rectangular two sided annular groove which receives the lowermost coil of, and thereby locates the lower end of, a downwardly-diverging, conical compression spring co-axial with the housing. In another embodiment, the cylindrical zone is followed by a downwardly diverging frusto-conical zone at about 2° to the axis, followed by a second cylindrical zone, itself followed by the frustoconical zone at about 10° to the axis. Owing to the provision of the frusto-conical zone at about 10° to the axis, during the later part of the opening movement of the valve member against the spring, the clearance between the driving part and the housing increases smoothly and considerably, and the driving part reaches a force equilibrium position at which the clearance is considerable. Two grooves formed in the housing and the closure part immediately below the valve seat bound an annular closed space for receiving liquid squeezed out downwardly at the valve seat as the closure part closes. Four equiangularly spaced fins extending upwards from the closure part support a co-axial tubular part which is a sliding fit in the housing and which terminates short of the closure part to leave liquid outlets.

The smoothly and considerably increasing clearance is intended to enable the valve device to cope with liquids of considerably differing viscosity. However, it has been found in practice that only a relatively limited range of viscosities can be coped with without replacement of parts. For example, it is desirable for such valve devices to be able to cope with a range of viscosities increasing from 3% fat milk, through 10% fat cream, through drinking yogurt, to natural yogurt with small fruit pulp. Yet, it has been found in practice that the valve device of EP00090664 requires the provision of a selection of driving parts of differing maximum external diameters in order to be able to cope with such a range of viscosities. However, with aseptic filling, dismantling of the filler in order to change from filling one liquid product to filling another is highly undesirable. The provision of the frusto-conical zone at about 2° to the axis followed by the second cylindrical zone does not assist in this respect, because these two zones are intended to provide a slight clearance relative to the driving part to ensure that, during the major part of the closing stroke of the valve member, liquid trapped between the driving part and a non-return valve upstream of the valve device can rapidly escape to below the driving part; the driving part is not intended to have an equilibrium position at either of these two zones. Another difficulty which has been found to arise in practice with the valve device of EPO090664 is that the liquid, having passed through the clearance between the driving part and the frustoconical zone at about 10° to the axis, not only finds itself having to turn through more than 90° owing to the presence of the substantially radial annular zone, but, as it encounters the lowermost coils of the spring, which collapse first during compression of the conical spring, the liquid then has to climb upwards over these substantially closed lowermost coils until it can penetrate through between higher coils of the spring. This may not constitute a problem with liquid of relatively low viscosity, for example 3% fat milk, but it proves an excessive obstruction for liquid of relatively high viscosity, such as natural yogurt with small fruit pulp. A further difficulty with the valve device of EP0090664 is that, with use, and particularly with liquids with a relatively high solid content, the two grooves formed in the housing and the closure part immediately below the valve seat become gradually clogged with solids. This results in the grooves not properly performing their function of trapping liquid squeezed out downwardly at the valve seat, with consequent dripping, and/or the closure part being obstructed from closing fully, resulting in leakage and consequent dripping. A yet further difficulty is that the use of four fins can produce problems in accurate centering of the valve member in the housing and also requires the valve member to have some means for retaining the valve member against turning relative to the housing around the axis, because the four liquid flows among the fins at the closure part tend to assume a squarish outline as seen in plan, so that there would be a risk that some of the liquid might miss a square-section carton at the corners of the squarish outline unless that outline is held substantially in register with the plan outline of the carton. A still further difficulty is that the manufacturing tolerances required to achieve a liquid-tight seal with a metal-to-metal seating are very high and, moreover, a metal-to-metal seating is unable to adapt itself sealingly to solid particles becoming deposited therebetween.

SUMMARY OF THE INVENTION

According to a first aspect of the present invention, there is provided a valve device for controlling liquid flow, comprising a tubular housing, a valve member extending substantially coaxially in said housing and movable relative to said housing and axially thereof between an open condition in which liquid can flow between said valve member and said housing and a closed condition, and biassing means urging said valve member into said closed condition, said valve member including an obturating portion which, in said closed condition, substantially obturates said tubular housing at a first location, said housing having an internal annular part of its internal surface which part gradually diverges outwardly at a gradually increasing angle to the axis of the housing in an axial direction away from said first location, without the diverging significantly discontinuing at any location along said part, the arrangement being such that said obturating portion, in its opening movement, sweeps in said axial direction along said surface and arrives at an equilibrium position at a variable, second location along said part in which liquid is flowing through between said obturating portion and said part and in which the total force tending to open said valve member is balanced by the total force tending to close the same.

This internal annular surface part can consist of, for example, a zone which is curved in planes containing the axis of the housing, or a series of frusto-conical zones of respective differing cone angles.

Giving the internal annular surface part a gradually increasing angle of divergence enables the device to cope with liquids of a wider range of viscosities.

According to a second aspect of the present invention, there is provided a valve device or controlling liquid flow, comprising a tubular housing, a valve member extending substantially coaxially in said housing and movable relative to said housing and axially thereof between an open condition in which liquid can flow between said valve member and said housing and a closed condition, and a coil-form compression spring disposed substantially co-axially in said housing and urging said valve member into said closed condition, said valve member including an obturating portion which, in said closed condition, substantially obturates said tubular housing at a first location and which substantially closes a nearer end of said spring, said housing having an internal surface which includes, at a second location downstream of said obturating portion, an annular zone converging in an axial direction away from said first location at a substantial angle to the axis of the housing and situated directly radially outwards of said spring, and which extends to the further end of said spring and there bears said further end.

In this manner, liquid passing the radially outer periphery of the obturating portion is guided less abruptly towards the spring.

According to a third aspect of the present invention, there is provided a valve device for controlling liquid flow, comprising a tubular housing, an annular valve seat on said housing and substantially co-axial therewith and bounding an internal surface of said housing, and a valve member including a valve closure part and extending substantially co-axially in said housing and movable relative to said housing downwardly axially thereof from a closed condition in which said closure part acts sealingly against said valve seat round an annulus of sealing to an open condition in which said closure part is spaced from said valve seat, said housing having a bottom outlet mouth encircled by an annular rim, and said closure part having an annular bottom lip which is arranged with such clearance relative to said annular rim that, shortly before said closure part acts sealingly against said valve seat during the closing movement of said valve member, said annular rim and said bottom lip act shearingly upon liquid between said annular rim and said bottom lip.

This clearance should be less than 0.5 mm., preferably less than 0.3 mm., and advantageously between 0.1 and 0.2 mm., to obtain the shearing action upon the liquid.

We have found that this shearing action, forcing the liquid either to drop immediately from the device, or to flow to upstream of the annulus of sealing, reduces subsequent dripping from the device.

According to a fourth aspect of the present invention, there is provided a valve device for controlling liquid flow, comprising a tubular housing, an annular valve seat on said housing and substantially co-axial therewith, and a valve member including a valve closure part and extending substantially co-axially in said housing and movable relative to said housing downwardly axially thereof from a closed condition in which said closure part acts sealingly against said valve seat to an open condition in which said closure part is spaced from said valve seat, said valve member also including fins extending longitudinally of said valve member and in sliding contact with the internal surface of said housing, said fins being equiangularly spaced round the axis of said housing and being only three in number.

The provision of only three fins has the advantage that there is no need to provide some means to retain the valve member against turning relative to the housing about the axis, because the three equidistantly spaced fins give the liquid flows among them at the closure part a more rounded overall plan outline than with the four fins, so that there is less risk that the liquid might miss a square-section carton. A consequential advantage is that, with the valve member free to turn about the axis, if the valve member is biased closed by a compression coil spring seated in an annular groove in the housing, then the spring is also free to turn about the axis, which it gradually does as it is compressed and relaxed, and so helps to clear the groove of solid and other matter which might otherwise accumulate therein. Also, the use of three fins instead of four can produce less friction between the housing and the valve member tending to oppose turning of the valve member, and so more turning of the valve member and the spring and thus a greater groove-clearing action.

According to a fifth aspect of the present invention, there is provided a valve device for controlling liquid flow, comprising a tubular housing, an annular valve seat on said housing and substantially co-axial therewith and bounding an internal surface of said housing, and a valve member including a valve closure portion and extending in said housing and movable relative to said housing axially thereof from a closed condition in which said closure portion acts sealingly against said valve seat round an annulus of sealing to an open condition in which said closure portion is spaced from said valve seat, one of said valve seat and said closure portion comprising elastomeric material moulded into a recess in metal and arranged to bound said annulus of sealing.

Thereby, lower manufacturing tolerances are necessary for the seating, and the seating can adapt itself sealingly to solid particles deposited therein.

BRIEF DESCRIPTION OF THE DRAWINGS

In order that the invention may be clearly understood and readily carried into effect, reference will now be made, by way of example, to the accompanying drawings, in which.

DESCRIPTION OF THE PREFERRED EMBODIMENT

Figure 1:
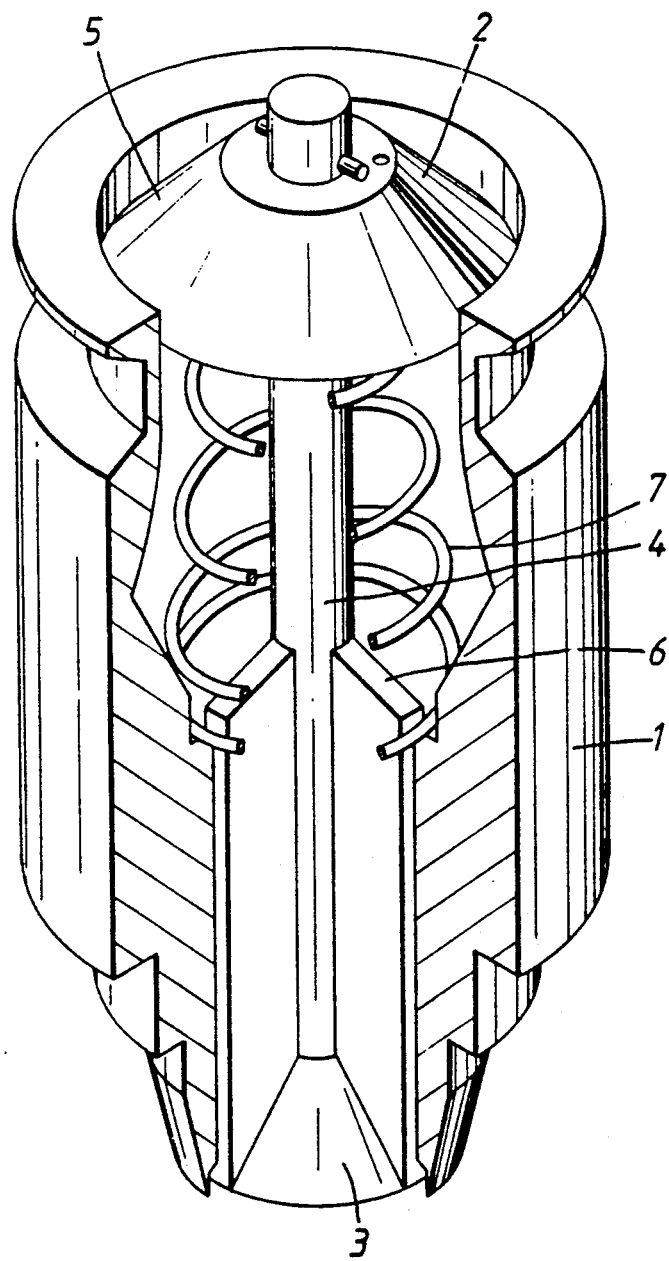
FIG. 1 shows a diagrammatic perspective view, with parts broken away, of a valve device for use in filling cartons with liquid.
Figure 2A:
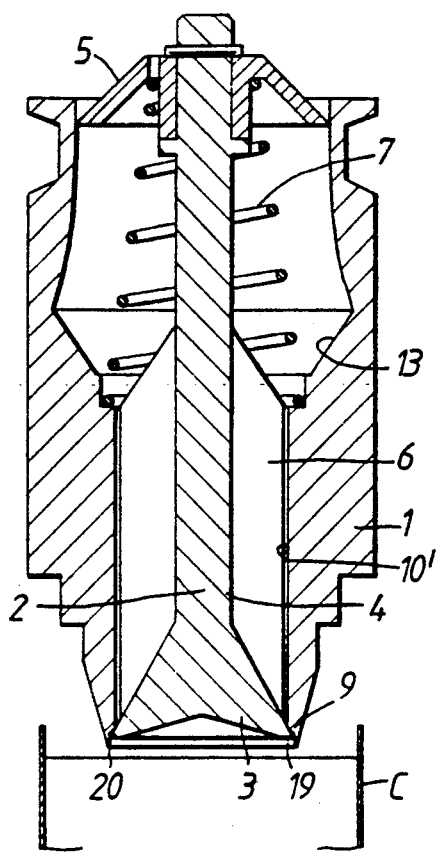
FIGS. 2A to 2D are diagrammatic axial sectional views through the valve device in various conditions of operation.

Referring to the drawings, the valve device includes a fixed, vertical, tubular, metal housing 1 in which is arranged coaxially a metal valve member 2 which consists of a frusto-conical closure part 3, a vertical central stem 4 extending upwardly from the part 3, a driving part 5 of hubbed, frusto-conical shape attached to the upper end of the stem 4, and three equangularly-spaced, vertical fins 6 extending upwardly from the part 3 and arranged to slide on the internal surface of the housing 1 in order to guide movement of the valve member 2 in the housing 1. A downwardly diverging, conical compression spring 7 acting between an internal, upwardly facing shoulder 8 of the housing 1 and the underside of the part 5 urges the valve member 2 into a closed condition shown in FIGS. 1 and 2A, in which the outer peripheral edge zone of the frusto-conical part 3 bears against the inner peripheral edge of a frusto-conical valve seat 9 formed a short distance above the lower extremity of the internal surface of the housing 1. For this purpose, the cone angle of the seat 9 is significantly greater than that of the part 3, for example 90° as opposed to 60°. The valve member 2 and the spring 7 are free to turn relative to the housing about the axis of the housing. The fins 6 terminate as closely as practical to the outer peripheral edge zone of the part 3, while leaving an adequate seating. From the valve seat 9, the internal surface of the housing 1 continues downwards as a circular cylindrical bore surface zone 10 to an annular rim 20 at the lower extremity of the housing 1. This rim has a sharp edge in order to reduce retention of liquid thereby. The internal surface of the housing 1 continues upwards from the valve seat 9 as a circular cylindrical bore surface zone 10' and thence as the upwardly facing surface zone of the shoulder 8. It then continues upwards as a circular cylindrical bore surface zone 11 which, with the upwardly facing surface of the shoulder 8, defines an annular groove locating the lower end of the spring 7. It then continues as a narrow, annular, upwardly-facing, radial zone 12 which is followed by a frusto-conical zone 13 which diverges upwardly at a significant angle, advantageously between 40° and 60°, but in this example 55°, to the axis of the housing 1. It then continues upwards as a series of frusto-conical surface zones 14, 15, 16 and 17. It ends, at the top of the housing 1, as a circular cylindrical bore surface zone 18. Progressing downwards from the surface zone 18, the internal surface part constituted by the zones 17 to 14 thus gradually diverges outwardly at a gradually increasing angle to the axis of the housing. The angles of the surfaces 17 to 14 to that axis are, respectively, 3°, 8°, 12° and 16°.

Figure 2B:
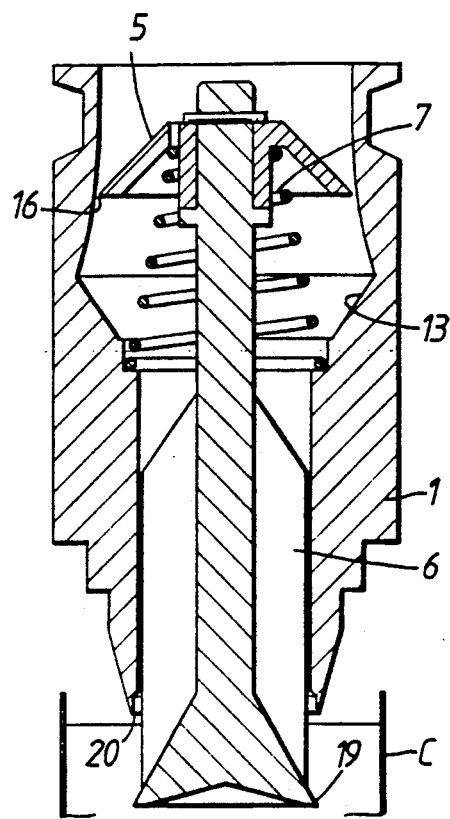
Figure 2C:
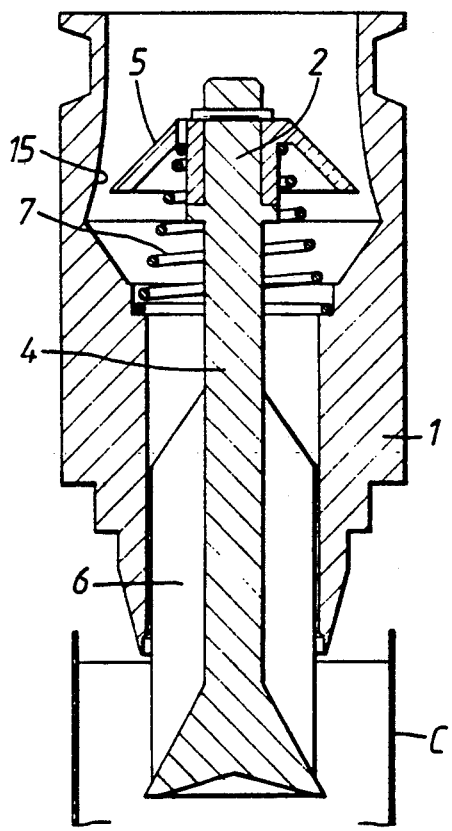

This gradual increase of the angle to the axis enables the valve device to cope with a wide range of viscosities of liquid, without the valve member 2 requiring a relatively large stroke. In the closed condition, the driving part 5 fits closely in the surface 18. In filling of carton C, if the liquid is, say, 3% fat milk, the part 5 takes up a force equilibrium position at about the zone 17; if 10% fat cream, an equilibrium position at about the zone 16, as shown in FIG. 2B; if drinking yogurt, an equilibrium position at about the zone 15, as shown in FIG. 2C and, if natural yogurt with small fruit pulp, an equilibrium position at about the zone 14, as shown in FIG. 2D.

Figure 2D:
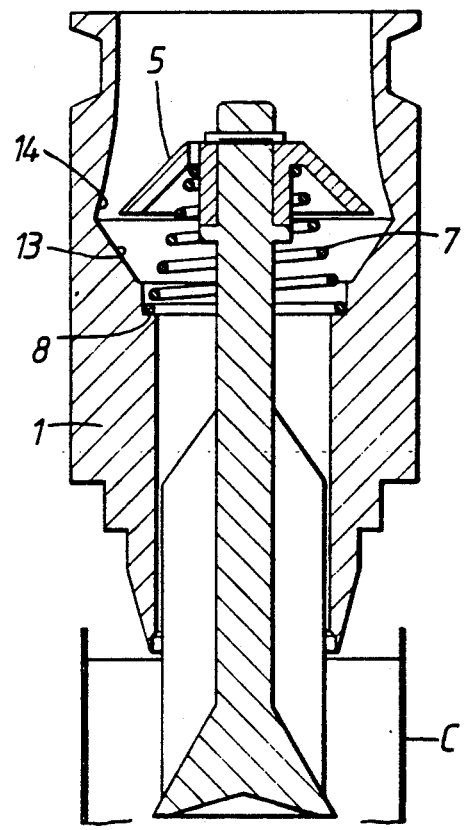
Figure 3:
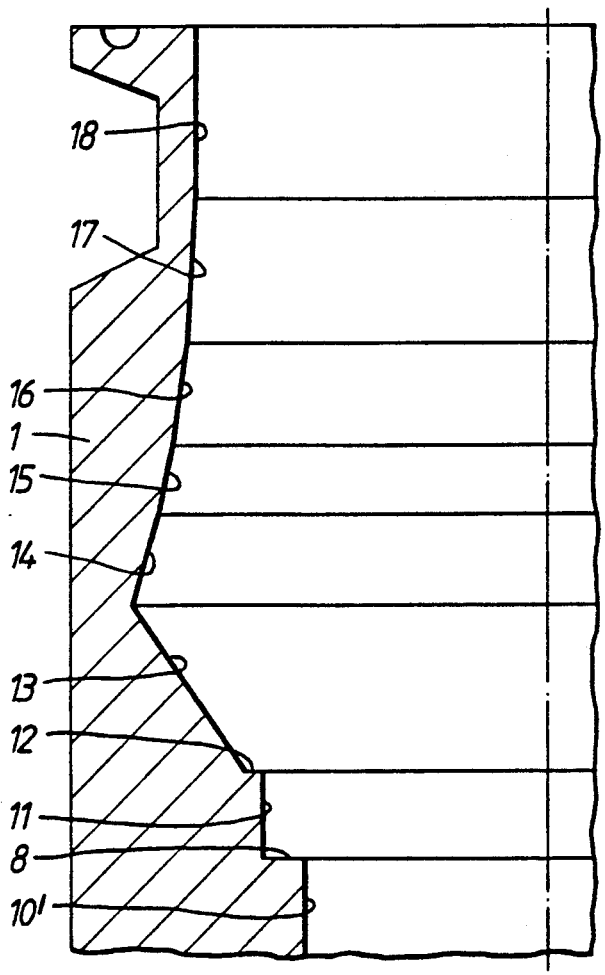
FIG. 3 shows a detail of any one of FIGS. 2A to 2D.
Figure 4:
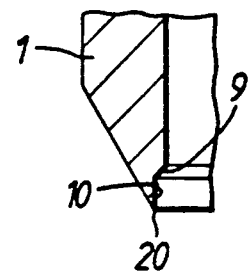
FIG. 4 shows another detail of any one of FIGS. 2A to 2D.

Even in the position shown in FIG. 2D there is still a relatively wide clearance between the part 5 and the zone 13, so that even relatively highly viscous liquid still has a relatively easy flow path towards the coils of the spring 7. To ease the passage of the liquid through the coils of the spring, the zone 11 is relatively deep, in fact of a greater cross-sectional dimension than the zone 8, so that the groove locating the lower end of the spring 7 receives the lowermost two or three coils of the spring, which are those which close up first, whereby it is the more open coils of the spring 7 to which the surfaces 13 and 12 guide the liquid.

The outermost edge 19 of the part 3 is annular and sweeps past the sharp rim 20 of the housing 1 with a relatively small clearance of between 0.1 and 0.2 mm., and this produces a shearing of "scissors" action upon the liquid between, which reduces dripping from the valve device after the carton C has been advanced from below the device.

The making of the cone angle of the part 3 significantly less than that of the valve seat 9 has the advantage of improving centering and thus sealing, of the part 3 in the seat 9.

Figure 5:
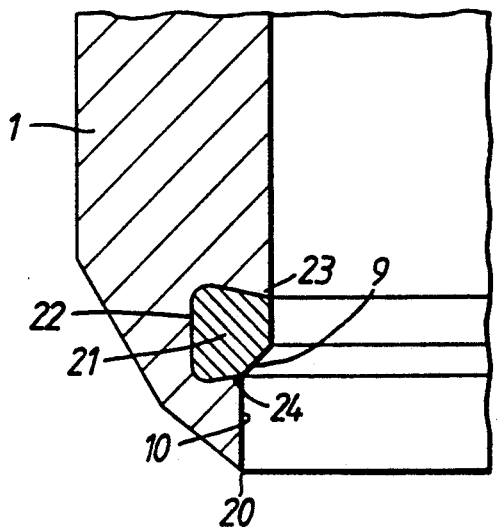
FIG. 5 shows a modification of the detail of FIG. 4.

Referring to FIG. 5, the valve seat 9 comprises a ring 21 of elastomeric material moulded into an annular recess 22 formed coaxially in the metal housing 1. The two annular lips 23 and 24 of the recess 22 are undercut so that the recess 22 widens internally from its mouth, to prevent the moulded-in ring 21 from slipping out of the recess. Thus the annulus of sealing is a metal-to-elastomer seating which lowers the manufacturing tolerances necessary and which can adapt itself sealingly to any solid particles trapped therein on closing of the part 3. Such moulding-in of the valve seat has the advantages of not providing any crevices into which solid matter, bacteria, etc. can penetrate and of avoiding the need to remove such sealing ring for cleaning purposes.

I claim:

1. A valve device for controlling liquid flow, comprising a tubular housing, a valve member extending substantially coaxially in said housing and movable relative to said housing and axially thereof between an open condition in which liquid can flow between said valve member and said housing and a closed condition, and biassing means urging said valve member into said closed condition, said valve member including an obturating portion which, in said closed condition, substantially obturates said tubular housing at a first location, said housing having an internal annular surface part of its internal surface which part gradually diverges outwardly at a gradually increasing angle to the axis of the housing in an axial direction away from said first location, without the diverging surface part discontinuing at any location along said part, the arrangement between such that said obturating portion, in its opening movement, sweeps in said axial direction along said surface and arrives at an equilibrium position at a variable, second location along said part in which liquid is flowing through between said obturating portion and said part and in which the total force tending to open said valve member is balanced by the total force tending to close the same.

2. A valve device according to claim 1, wherein said internal annular surface part consists of a zone which is curved in planes containing the axis of the housing.

3. A valve device according to claim 1, wherein said internal annular surface part consists of a series of frusto-conical zones of respective differing cone angles.

4. A valve device according to claim 3, wherein said respective differing cone angles are about 3°, about 8°, about 12° and about 16°.

5. A valve device according to claim 1, wherein said biasing means is a coil-form compression spring disposed substantially coaxially in said housing and urging said valve member into said closed condition, said obturating portion substantially closes a nearer end of said spring, said internal surface includes, downstream of said obturating portion, an annular zone converging in an axial direction away from said first location at an angle to the axis of the housing in a range on the order of 40° to 60° and situated directly radially outwards of said spring, and said internal surface extends to the further end of said spring and there bears said further end.

6. A valve device according to claim 1, and further comprising, downstream of said first location and said second location, an annular valve seat on said housing and substantially co-axial therewith and bounding said internal surface, said valve member including a valve closure portion movable relative to said housing downwardly axially thereof from a closed condition in which said closure portion acts sealingly against said valve seat round an annulus of sealing to an open condition in which said closure portion is spaced from said valve seat, said housing having a bottom outlet mouth encircled by an annular rim, and said closure portion having an annular bottom lip which is arranged with such clearance relative to said annular rim that, shortly before said closure portion acts sealingly against said valve seat during the closing movement of said valve member, said annular rim and said bottom lip act shearingly upon liquid between said annular rim and said bottom lip.

7. A valve device according to claim 6, wherein said clearance is less than 0.5 mm.

8. A valve device according to claim 7, wherein said clearance is less than 0.3 mm.

9. A valve device according to claim 8, wherein said clearance is between 0.1 and 0.2 mm.

10. A valve device according to claim 1, and further comprising, downstream of said first location and said second location, an annular valve seat on said housing and substantially co-axial therewith and bounding said internal surface of said housing, said valve member including a valve closure portion movable relative to said housing axially thereof from a closed condition in which said closure portion acts sealingly against said valve seat round an annulus of sealing to an open condition in which said closure portion is spaced from said valve seat, one of said valve seat and said closure portion comprising elastomeric material moulded into a recess in metal and arranged to bound said annulus of sealing.

11. A valve device for controlling liquid flow, comprising a tubular housing, a valve member extending substantially coaxially in said housing and movable relative to said housing and axially thereof between an open condition in which liquid can flow between said valve member and said housing and a closed condition, and a coil-form compression spring disposed substantially coaxially in said housing and urging said valve member into said closed condition, said valve member including an obturating portion which, in said closed condition, substantially obturates said tubular housing at a first location and which substantially closes a nearer end of said spring, said housing having an internal surface which includes, at a second location downstream of said obturating portion, an annular zone converging in an axial direction away from said first location at an angle to the axis of the housing in a range on the order of 40° to 60° and situated directly radially outwards of said spring, and which extends to the further end of said spring and there bears said further end.

12. A valve device for controlling liquid flow, comprising a tubular housing, an annular valve seat on said housing and substantially co-axial therewith and bounding an internal surface of said housing, and a valve member including a valve closure part and extending substantially co-axially in said housing and movable relative to said housing downwardly axially thereof from a closed condition in which said closure part acts sealingly against said valve seat round an annulus of sealing to an open condition in which said closure part is spaced from said valve seat, said housing having a bottom outlet mouth encircled by an annular rim which projects axially downwardly beyond said closure part in said closed condition of said closure part to terminate in an annular free extremity, and said closure part having an annular bottom lip which is spaced axially upwards from said annular free extremity in said closed condition and which is arranged with such clearance relative to said annular rim that, shortly before said closure part acts sealingly against said valve seat during the closing movement of said valve member, said annular rim and said bottom lip act shearingly upon liquid between said annular rim and said bottom lip.

13. A valve device according to claim 12, wherein said clearance is less than 0.5 mm.

14. A valve device according to claim 13, wherein said clearance is less than 0.3 mm.

15. A valve device according to claim 14, wherein said clearance is between 0.1 and 0.2 mm.

* * * * *